(12) United States Patent
Nichani

(10) Patent No.: US 6,721,461 B1
(45) Date of Patent: *Apr. 13, 2004

(54) METHOD AND APPARATUS USING IMAGE SUBTRACTION AND DYNAMIC THRESHOLDING

(75) Inventor: Sanjay Nichani, Natick, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 09/844,451

(22) Filed: Apr. 27, 2001

Related U.S. Application Data

(60) Continuation of application No. 09/478,840, filed on Jan. 7, 2000, now Pat. No. 6,269,194, which is a division of application No. 08/976,931, filed on Nov. 24, 1997, now Pat. No. 6,061,476.

(51) Int. Cl.[7] .................................................. G06T 5/50
(52) U.S. Cl. ........................ 382/270; 382/145; 382/149
(58) Field of Search ................................ 382/270, 141, 382/145, 149; 358/465, 466

(56) References Cited

U.S. PATENT DOCUMENTS

| | | |
|---|---|---|
| 5,047,851 A | 9/1991 | Sauerwein et al. .......... 382/149 |
| 5,859,698 A | 1/1999 | Chau et al. ................. 382/149 |
| 5,949,901 A | 9/1999 | Nichani et al. ............. 382/149 |

OTHER PUBLICATIONS

Ballard, et al., *Computer Vision*, Department of Computer Science, University of Rochester, Rochester, NY, 1982, pp. 1–103.

Gonzales, et al., *Digital Image Processing*, Electrical Engineering Department, University of Tennessee, Addison–Wesley Publishing Company, Nov. 1987, pp. 354–368.

*Primary Examiner*—Thomas D. Lee
(74) *Attorney, Agent, or Firm*—Brian Michaelis

(57) ABSTRACT

A method and apparatus implementing dynamic thresholding techniques in processes that use image subtraction. The subtracted image is separated into a positive difference image using a positive image map and a negative difference image using a negative image map. A positive threshold map and a negative threshold map process a Gaussian filtered first image to generate respective positive and negative dynamic threshold images. The positive and negative threshold map mask out irrelevant areas and implement adaptive gain in pixel thresholds proportional to a difference or contrast between foreground or feature of interest and local background. Dynamic thresholding is a subtraction providing a subtracted positive image and a subtracted negative image. The subtracted positive and subtracted negative images are combined to provide a merged image which is binarized. Edge or Interface detection involves edge detection and true peak detection to find the edge peaks in a pre-image and post image. A binarization map converts edge peak pre and post images and the post image is then dilated to compensate any mis-registration. The dilated post image is subtracted from the binary edge pre-image to form an edge subtraction image. Pixels absent from the post image are assumed to be occluded by a feature of interest. The two binary images are merged, filtered, and connectivity is effected to obtain position and size of contiguous regions of interest.

1 Claim, 12 Drawing Sheets

PRE-IMAGE
(IMAGE 1)

| [Col. 1] | [Col. 2] | [Col. 3] | [Col. 4] | [Col. 5] |
|---|---|---|---|---|
| 70 | 70 | 120 | 150 | 150 |
| 70 | 70 | 120 | 150 | 150 |
| 70 | 70 | 120 | 150 | 150 |
| 70 | 70 | 120 | 150 | 150 |
| 70 | 70 | 120 | 150 | 150 |

*FIG. 5A*

POST IMAGE
(Image 2)

| 120 | 120 | 120 | 120 | 120 |
|---|---|---|---|---|
| 120 | 120 | 120 | 120 | 120 |
| 120 | 120 | 120 | 120 | 120 |
| 120 | 120 | 120 | 120 | 120 |
| 120 | 120 | 120 | 120 | 120 |

*FIG. 5B*

SUBTRACTION IMAGE
$(I_1 - I_2)$

| -50 | -50 | 0 | 30 | 30 |
|---|---|---|---|---|
| -50 | -50 | 0 | 30 | 30 |
| -50 | -50 | 0 | 30 | 30 |
| -50 | -50 | 0 | 30 | 30 |
| -50 | -50 | 0 | 30 | 30 |

*FIG. 5C*

POSITIVE DIFFERENCE IMAGE

| 0 | 0 | 0 | 30 | 30 |
|---|---|---|----|----|
| 0 | 0 | 0 | 30 | 30 |
| 0 | 0 | 0 | 30 | 30 |
| 0 | 0 | 0 | 30 | 30 |
| 0 | 0 | 0 | 30 | 30 |

*FIG. 5D*

NEGATIVE DIFFERENCE IMAGE

| 50 | 50 | 0 | 0 | 0 |
|----|----|---|---|---|
| 50 | 50 | 0 | 0 | 0 |
| 50 | 50 | 0 | 0 | 0 |
| 50 | 50 | 0 | 0 | 0 |
| 50 | 50 | 0 | 0 | 0 |

*FIG. 5E*

POSITIVE DYNAMIC THRESHOLD IMAGE

| 255 | 255 | 255 | 18 | 18 |
|-----|-----|-----|----|----|
| 255 | 255 | 255 | 18 | 18 |
| 255 | 255 | 255 | 18 | 18 |
| 255 | 255 | 255 | 18 | 18 |
| 255 | 255 | 255 | 18 | 18 |

*FIG. 5F*

NEGATIVE DYNAMIC THRESHOLD IMAGE

| | | | | |
|---|---|---|---|---|
| 20 | 20 | 255 | 255 | 255 |
| 20 | 20 | 255 | 255 | 255 |
| 20 | 20 | 255 | 255 | 255 |
| 20 | 20 | 255 | 255 | 255 |
| 20 | 20 | 255 | 255 | 255 |

*FIG. 5G*

SUBTRACTED POSITIVE IMAGE
(5d-5f)

| | | | | |
|---|---|---|---|---|
| -255 | -255 | -255 | 12 | 12 |
| -255 | -255 | -255 | 12 | 12 |
| -255 | -255 | -255 | 12 | 12 |
| -255 | -255 | -255 | 12 | 12 |
| -255 | -255 | -255 | 12 | 12 |

*FIG. 5H*

SUBTRACTED NEGATIVE IMAGE
(5e-5g)

| | | | | |
|---|---|---|---|---|
| 30 | 30 | -255 | -255 | -255 |
| 30 | 30 | -255 | -255 | -255 |
| 30 | 30 | -255 | -255 | -255 |
| 30 | 30 | -255 | -255 | -255 |
| 30 | 30 | -255 | -255 | -255 |

*FIG. 5I*

POSITIVE RESULTS IMAGE

| | | | | |
|---|---|---|---|---|
| 0 | 0 | 0 | 255 | 255 |
| 0 | 0 | 0 | 255 | 255 |
| 0 | 0 | 0 | 255 | 255 |
| 0 | 0 | 0 | 255 | 255 |
| 0 | 0 | 0 | 255 | 255 |

*FIG. 5J*

NEGATIVE RESULTS IMAGE

| | | | | |
|---|---|---|---|---|
| 255 | 255 | 0 | 0 | 0 |
| 255 | 255 | 0 | 0 | 0 |
| 255 | 255 | 0 | 0 | 0 |
| 255 | 255 | 0 | 0 | 0 |
| 255 | 255 | 0 | 0 | 0 |

*FIG. 5K*

MAX MERGE
(5J & 5K)

| | | | | |
|---|---|---|---|---|
| 255 | 255 | 0 | 255 | 255 |
| 255 | 255 | 0 | 255 | 255 |
| 255 | 255 | 0 | 255 | 255 |
| 255 | 255 | 0 | 255 | 255 |
| 255 | 255 | 0 | 255 | 255 |

*FIG. 5L*

BINARIZED FOREGROUND/BACKGROUND

| 1 | 1 | 0 | 1 | 1 |
| 1 | 1 | 0 | 1 | 1 |
| 1 | 1 | 0 | 1 | 1 |
| 1 | 1 | 0 | 1 | 1 |
| 1 | 1 | 0 | 1 | 1 |

*FIG. 5M*

Merging

BINARY EDGE PEAK PRE-IMAGE

| 0 | 0 | 255 | 0 | 0 |
| 0 | 0 | 255 | 0 | 0 |
| 0 | 0 | 255 | 0 | 0 |
| 0 | 0 | 255 | 0 | 0 |
| 0 | 0 | 255 | 0 | 0 |

*FIG. 8A*

BINARY EDGE PEAK POST-IMAGE

| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |

*FIG. 8B*

EDGE SUBTRACTION IMAGE

| 0 | 0 | 255 | 0 | 0 |
| 0 | 0 | 255 | 0 | 0 |
| 0 | 0 | 255 | 0 | 0 |
| 0 | 0 | 255 | 0 | 0 |
| 0 | 0 | 255 | 0 | 0 |

*FIG. 8C*

METHOD AND APPARATUS USING IMAGE SUBTRACTION AND DYNAMIC THRESHOLDING

RELATED APPLICATIONS

The present application claims continuation to an application filed in the United States Patent and Trademark Office on Jan. 7, 2000, application Ser. No. 09/478,840 now U.S. Pat. No. 6,269,194, the entire teachings of which are incorporated herein by reference. The Ser. No. 09/478,840 application claimed divisional from an application filed in the USPTO Nov. 24, 1997, application Ser. No. 08/976,931, the entire teachings of which are incorporated herein by reference, which is now U.S. Pat. No. 6,061,476, issued on May 9, 2000.

FIELD OF THE INVENTION

The present invention relates to machine vision systems, and more particularly to a method and apparatus implementing thresholding in an automated vision inspection context.

BACKGROUND OF THE INVENTION

Machine vision systems are known and widely in use for numerous inspection applications, including inspection of solder paste on printed circuit boards, location of defects on printed labels, and inspection of adhesives on a die, or the like. In many such automated inspection applications a basic issue addressed in the inspection process is a determination of the presence/absence, or measurement of a feature of interest (called the "foreground"), e.g. solder or adhesive, within the context of a complex background. Complex backgrounds, e.g. the surface of a printed circuit board or a label or die, may include various geometric configurations, great variability in darkness and brightness, and/or light reflection and/or shadowing. Intricate backgrounds with a variety of gray levels, for example solder pads and board surface, and/or different polarities with respect to paste gray level values, make it difficult for the inspection system to discern the features of interest from the complexities of the background.

Segmentation is an important concept applied in machine vision for various inspection/location applications, such as those requiring the location/inspection of features of interest in complex backgrounds. Segmentation generally means discriminating (or segmenting) an image involved in a machine vision process into features of interest (i.e. foreground) and background, on a pixel by pixel basis.

Various techniques are known, and others have been proposed, for implementing segmentation in machine vision applications. Some segmentation implementations, such as those described in Gonzalez & Wintz, Digital Image Processing, Second Edition Section 7.3, pages 354–367, Addison-Wesley, 1987 involve computing histograms and then deriving suitable thresholds to segment the image. That is, the image is processed on a pixel by pixel basis to determine gray level values for the pixels, and the image pixels are correlated in accordance with frequency of occurrence of particular gray level values. A suitable fixed threshold in the form of a simple scalar value is ascribed to the image, above or below which a pixel will be designated either as a background pixel or as a pixel associated with a feature of interest.

However, segmentation via known thresholding techniques has limited applicability. In many applications the scenes are very complex and are thus not conducive to selection of a particular scalar value for discriminating between background and features of interest. For instance, within an image of an object under inspection there may be pixels relating to features of interest that have virtually the same gray level value as pixels relating to some background aspect. Further there may be a lot of variation of gray level values for pixels related to the same aspect of objects under inspection, from one image to another, so that use of a fixed scalar threshold value results in a particular pixel or set of pixels being designated as background in one image of an object under inspection and as a feature of interest in another image.

Image subtraction can be used to somewhat overcome the problems associated with segmentation of complex scenes. As known in the art, image subtraction is typically implemented in two different ways: in static methods, and in dynamic methods.

In static methods, a run-time image of the object under inspection or part is subtracted from a "golden image," i.e. an image of a known good representation of the part (referred to as a "golden sample"). An example of a static method implementing image subtraction is a label inspection process that uses a "Golden Template Comparison" vision tool as known in the art. Such a process typically involves a golden image of the label under inspection, which is subtracted from a respective image of each label inspected during run time. A respective difference image is used to identify differences between the object/label under inspection and the golden sample. The differences may be quantified as defects.

In dynamic image subtraction methods, two images of the same part taken at two different points in time are subtracted. An example of a dynamic method implementing image subtraction is a solder paste inspection process that uses an image of a printed circuit board ("PCB") captured before solder is applied (a "pre-image"), and an image of the same PCB after solder is applied (a "post-image"), for inspection that determines whether the solder was properly applied to the PCB. The pre-image is subtracted from the post-image so that a respective difference image is generated for each PCB inspected during run time. The difference image is used to identify differences between the pre-image and the post-image, which correspond to areas where solder paste has been applied.

After the image subtraction step, a thresholding step is necessary to binarize the difference image, assigning one value (i.e. "0") to gray values in the difference image that are less than the threshold value (background), and another value (i.e. "1") to gray values in the difference image that are equal to or greater than the threshold value (features of interest or foreground). This is followed by connectivity analysis to complete the segmentation process by relating or connecting adjacent pixels of the same binary value and identifying them as objects of interest or background.

Similar processing is involved in dynamic methods known in the art used for adhesive inspection on a printed circuit board or on a die, and envelope check box content identification which also use multiple images that are a function of multiple light sources.

Disadvantageously, the thresholding step used in known dynamic or static segmentation methods that involve image subtraction typically is achieved by using a simple scalar value as a threshold. In most practical cases this is inadequate and leads to difficulties in discriminating features of interest from background, especially if there is a complex background. Variations in gray level values of similar constructs within a single image and variations in gray level values of the same object from image to image make it difficult to select a single scalar threshold value. Process variations, such as variations in lighting and variations in appearance between objects under inspection, exacerbate the difficulty in locating/inspecting features of interest on complex background(s) using a scalar value threshold.

Similarly, polarities of gray level values of background that are greater or less than the gray level values of features of interest create difficulties in assigning a single threshold value for a given image. In some inspection implementations the background could have areas that are darker and some areas that are brighter than the feature of interest. If contiguous regions are of such opposite polarity, the "edge" or interface between the regions will transition through the gray level(s) of the feature of interest. In particular, in pre-post solder paste inspection implementations, at interface areas or edges where board meets solder pads and the gray value is substantially equal to the gray value of the solder paste, the subtraction operation results in interfaces going undetected, i.e. the areas of edges between the board and pad are effectively ignored.

SUMMARY OF THE INVENTION

The present invention provides a method and apparatus implementing dynamic thresholding techniques in processes that use image subtraction, such as in an automated vision inspection context.

According to the invention, in a foreground/background detection implementation a first image and a second image are first filtered with a median filter to produce a first filtered image and a second filtered image having reduced noise. The first and second filtered images are then subtracted resulting in a subtracted image. The subtracted image is separated into two components, using respective image maps. A positive image map is used to generate a positive difference image consisting of positive differences which are processed in a positive "channel", and a negative image map is used to generate a negative difference image consisting of absolute values of the negative differences which are processed in a negative "channel".

In the positive channel and the negative channel, respectively, a Gaussian filtered first image is subjected to a positive threshold map and a negative threshold map to generate respective positive and negative dynamic threshold images. The positive threshold map and the negative threshold map are pixel maps that: 1) mask out areas that are not relevant to the respective positive and negative channels, and 2) implement adaptive gain in the form of pixel thresholds that are proportional to a difference in gray level value or amount of contrast between the gray level value of the feature of interest in the foreground and the local background area, e.g. the difference or contrast between solder paste gray level value and board (or pad) value.

Thresholding is implemented in the positive channel by subtracting the positive difference image from the positive dynamic threshold image, providing a subtracted positive image. Likewise, thresholding is implemented in the negative channel by subtracting the negative difference image from the negative dynamic threshold image, providing a subtracted negative image. The subtracted positive and subtracted negative images are each passed through a common conversion map to eliminate negative values and provide a positive results image and a negative results image wherein positive values are set to 255 (pixels that were greater than the threshold) and the rest are set to 0. Next, the two channels. i.e. the positive results image and the negative results image are combined to provide a merged image. The merged image is then binarized to provide binarized foreground/background detection output wherein all positive values, i.e. pixels representing features of interest in the foreground (e.g. solder on a pad), are set to "1" and zero values, i.e. background pixels, are set to "0".

In some inspection implementations the background may have some areas that are darker and some areas that are brighter than the feature of interest. If contiguous regions are of such opposite polarity, the "edge" or interface between the regions will transition through the gray level(s) of the feature of interest. In particular, in pre-post solder paste inspection implementations, at interface areas or edges where background meets solder pads and the gray value is substantially equal to the gray value of the solder paste, the subtraction and dynamic thresholding operations result in interfaces going undetected, i.e. the areas of edges between the board and pad are ignored. According to the invention, interface detection is handled by an edge interface algorithm.

In further accord with the pre-post solder paste inspection implementation according to the invention, interface detection involves initially processing the pre-image and the post-image with a median filter to reduce noise and provide a filtered pre-image and a filtered post image. The filtered pre and post images are then passed through an edge detector, followed by peak detection to find the edge peaks and provide an edge peak pre-image and an edge peak post image. Next, a binarization map is used to convert the edge peak pre and post images to respective 8-bit binary images (i.e. binary edge pre-image, binary edge post image), where the presence of an edge peak is denoted by a value of 255 and the lack of a peak is denoted by a value of 0. The edge peak post image is then dilated to compensate for sub-pixel mis-registration (forming a dilated post image). The dilated post image is then subtracted from the binary edge pre-image to form an edge subtraction image. If a pixel was associated with an edge in the pre-image and was absent from the dilated post image then the result of the subtraction for that pixel is positive (255), and it is assumed that it must be occluded by paste in the post-image, and hence that edge pixel must constitute a paste pixel.

The resultant edge subtraction image is then mapped to get rid of any negative values and provide an edge difference image having all positive and zero values. The edge difference image is dilated to account for slow transitioning interfaces or edges, and binarized to set the positive values to "1" and the zero values to "0".

Ultimately, the two binary images (i.e. the binarized foreground/background detection output and the binarized edge detection output) are merged using a binary-OR operation, to form a merged binary image. The merged binary image is then subjected to a morphological filter to effect cleanup, and a connectivity operation is effected in accordance with a specified minimum feature area, to obtain an indication of position and size of contiguous paste regions.

Features of the invention include a flexible dynamic thresholding implementation that is applicable in a variety of vision system subtraction contexts. For example, the type of first image and second image subtracted in a foreground/background detection implementation can be, respectively, a pre-image and post-image, a golden sample model image and a runtime image, or an image under first lighting conditions and another image under second lighting conditions.

Advantageously, the use of an effective dynamic threshold image such that each pixel in the subtracted image has its own threshold value results in a local threshold, rather than a fixed single scalar threshold value, which allows for adapting the threshold to the background locally within an image. The threshold image, which is derived from the background image (first or pre-image) is dynamic as it is generated for every new part that is processed and therefore the method and apparatus according to the invention has a higher level of tolerance for differences between images of a single object type. Greater flexibility in thresholding, and consequently more accurate segmentation, is provided by use of both positive and negative difference images which are subtracted/compared against separate threshold images.

The implementation of adaptive gain results in proportionate thresholding, in that the greater the difference between the background gray level value(s) and the gray level value(s) of the feature(s) of interest, the greater the contrast (subtraction value), and therefore the value of the threshold is increased proportionately. This feature permits the method and apparatus according to the invention to adapt to varying backgrounds by being more unbiased in passing signal relative to noise. It also allows for having the highest possible threshold for each background to permit more accurate discrimination.

Although the thresholding according to the invention is dynamic, a simple linear function is used to derive the dynamic threshold(s) from the background. The slopes of the linear functions used to derive the threshold images for the two different polarities are independent and advantageously facilitate flexibility in implementing adaptive gain as a function of the application. Masking implemented in the independent channel threshold maps ensures that difference values in areas of background with the wrong polarity are ignored and will not pose problems discriminating foreground from background. For example, areas on a solder pad which get brighter due to any spurious reflections can be ignored, since the solder paste is darker than the pad.

Furthermore, a more robust segmentation is facilitated, as compared to prior art segmentation/thresholding implementations which typically assume that there are no regions of the background with the same gray level as the feature(s) of interest. This assumption is not always reasonable in that it is violated at the edges of the background. In the method and apparatus according to the invention, the edge interface between pads and boards, which transitions through and may have at some pixels the same gray levels as the solder paste, can be discriminated as the edge interface between the different areas of the background are handled separately.

BRIEF DESCRIPTION OF THE DRAWING

The foregoing and other features and advantages of the present invention will be more fully understood from the following detailed description of illustrative embodiments, taken in conjunction with the accompanying drawing in which:

FIGS. 5a–5m are illustrative pixel values in an example of the pre and post image representations of FIGS. 4a and 4b processed according to a method and apparatus implementing the foreground/background detection processing (segmentation) of FIG. 3;

FIGS. 8a–8c are illustrative pixel values in an example of pre and post image representations processed according to the method and apparatus implementing the interface detection processing of FIG. 7.

DETAILED DESCRIPTION

Figure 1:
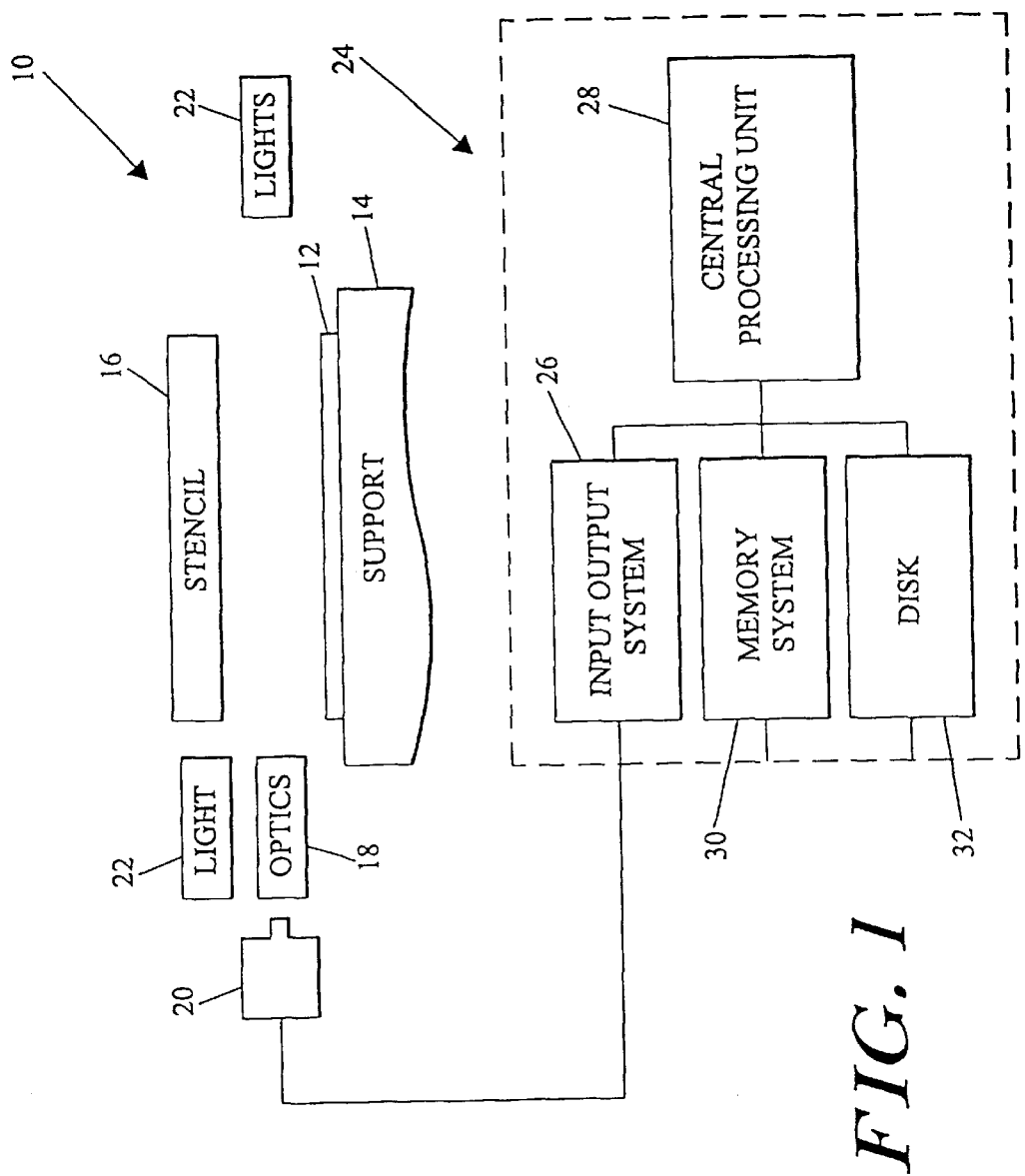
FIG. 1 is a block diagram which depicts an illustrative machine vision system for practicing the invention.

The present invention is illustratively implemented in the context of an in-line solder paste inspection system. Such a solder paste inspection system incorporating a vision system is generally illustrated in FIG. 1. The in-line solder paste inspection is implemented in a solder paste printing process. The printing process uses screen printers and is typically effected on bare printed circuit boards (PCBs) in a manufacturing production line prior to placement of components on the board. The bare PCB is placed on or transported to a screen printing station 10, whereat the PCB 12 is held firmly in place on a support 14 by either vacuum or mechanical means. The screen printing station includes an upper portion that houses a stencil 16 having apertures that correspond to areas of interest on the PCB, such as solder pads, where solder is to be disposed.

Optics 18, such as programmable X-Y telecentric optics, a CCD camera 20 and flash lighting 22, all known in the art, are used in conjunction with a vision system and vision tools known in the art, to capture images of stencil 16 and board 12 fiducials to effect registration, i.e. alignment of the stencil to the board. The vision system and related components are further used to effect location/inspection of features of interest, as described in detail hereinafter.

In the illustrative in-line solder paste inspection system, processing is done according to a "pre-post method." In a pre-post method and apparatus implementing dynamic thresholding techniques according to the invention, prior to closing the fixture (i.e. moving the stencil proximate to the PCB for printing), the vision system captures one or more images of areas of interest on the PCB, referred to as a "pre-image". After printing solder paste (hopefully in appropriate areas such as solder pads) on the PCB, the stencil is actuated away from the PCB and a post-printing image (i.e. "post-image") of the PCB is captured.

The vision system 24, such as a Cognex 5000 Series vision system and associated vision tools, is integrated in the printing process via the image acquisition components of the system, to effect inspection. The captured pre-image and post image, in the form of digital data representing image picture element (pixel) intensity in the form of "gray level values", in a conventional manner, is transmitted to the vision system for image analysis according to the processing described hereinafter. Image analysis is conventionally performed in the system by integrated facilities comprising an input/output system 26 receiving the captured images, one or more central processing units (CPUs) 28 processing data such as according to the present invention, and memory 30 and mass storage 32 (such as one or more disk drives) for storage and manipulation of the data.

The purpose of the solder paste inspection is to determine the presence, absence, alignment and/or area measurement of paste on various sites on the PCB. The gray level values of the paste are typically brighter/higher than the board but are darker/lower than solder pad gray level values. The paste is typically dispensed on the pad but due to mis-printing, a part of it may be printed off-pad, i.e. on the board (which has to be detected).

Initially, in the pre-post method used to solve the problem of solder paste inspection, a vision tool such as Cognex Point-Registration tool is used to register or align the pre-image captured before the paste is dispensed and the post-image captured after the paste is dispensed. The method and apparatus described hereinafter assumes that the pre and post images have been registered.

Figure 2:
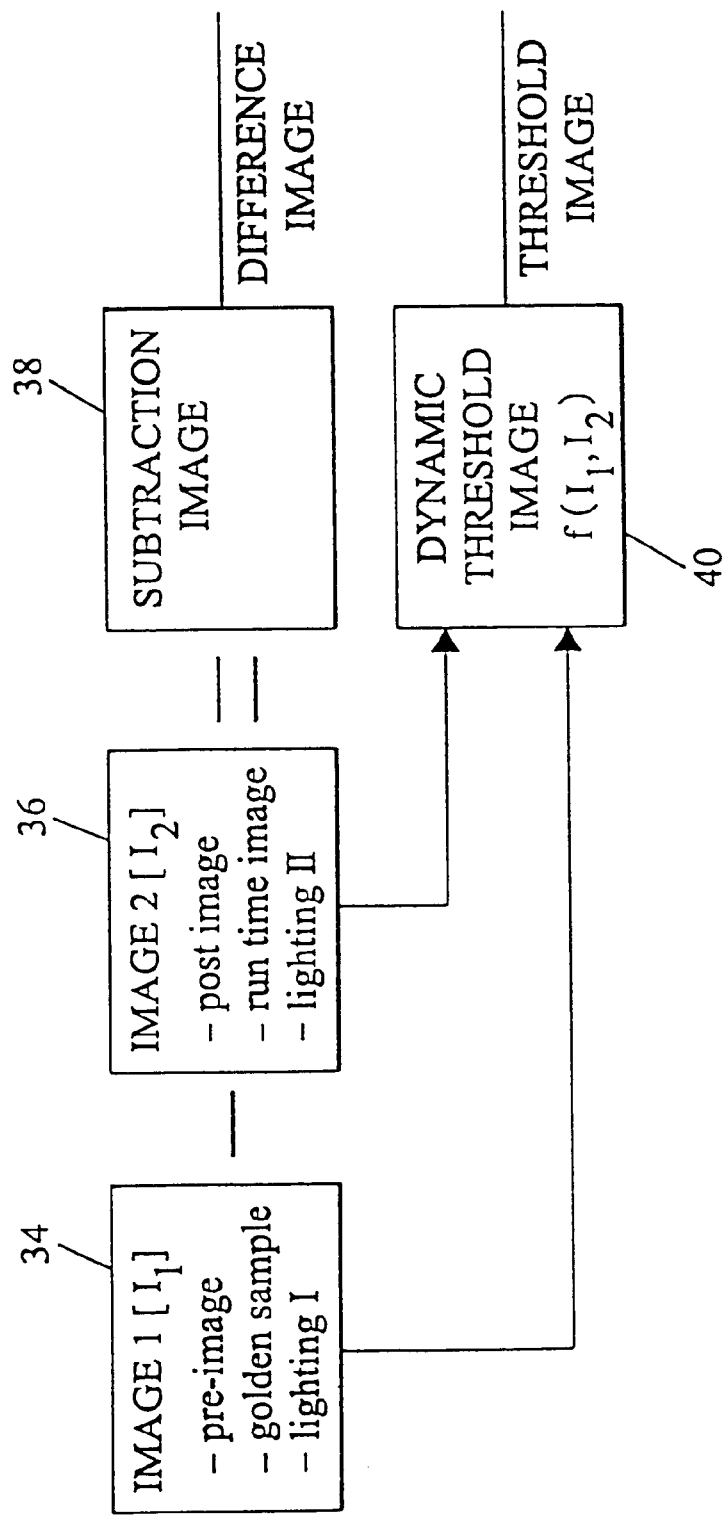
FIG. 2 is a high level block diagram generally depicting the relationships between a first image, a second image, a subtraction image and a threshold image in a method and apparatus according to the invention.

Generally, as illustrated in FIG. 2, the method and apparatus implementing dynamic thresholding techniques according to the invention is applicable in a variety of vision system subtraction contexts that involve processing of a first image 34 and a second image 36 to yield a subtraction image 38. For example, the type of first image(s) and second image(s) subtracted in a foreground/background detection implementation can be, respectively, a pre-image and post-image, a golden sample model image and a runtime image, or an image under first lighting conditions (lighting I) and another image under second lighting conditions (lighting II). A dynamic threshold image 40, according to the invention, is determined as a function of the first image 34 and the second image 36, and ascribes a threshold to each of the pixels in the image corresponding to the subtraction image. The threshold image according to the invention is said to be "dynamic" in that the thresholds associated with each pixel comprising the threshold image change due to their dependence upon the relationship between respective pixels in the first image and the second image. The function $[f(I_1, I_2)]$ that defines the relationship between respective pixels in the first image and the second image is application dependent and can be changed by modifying mechanisms (e.g. Maps or lookup tables) that implement the functions (e.g. linear) in the embodiment of the invention as described hereinafter.

Figure 3:
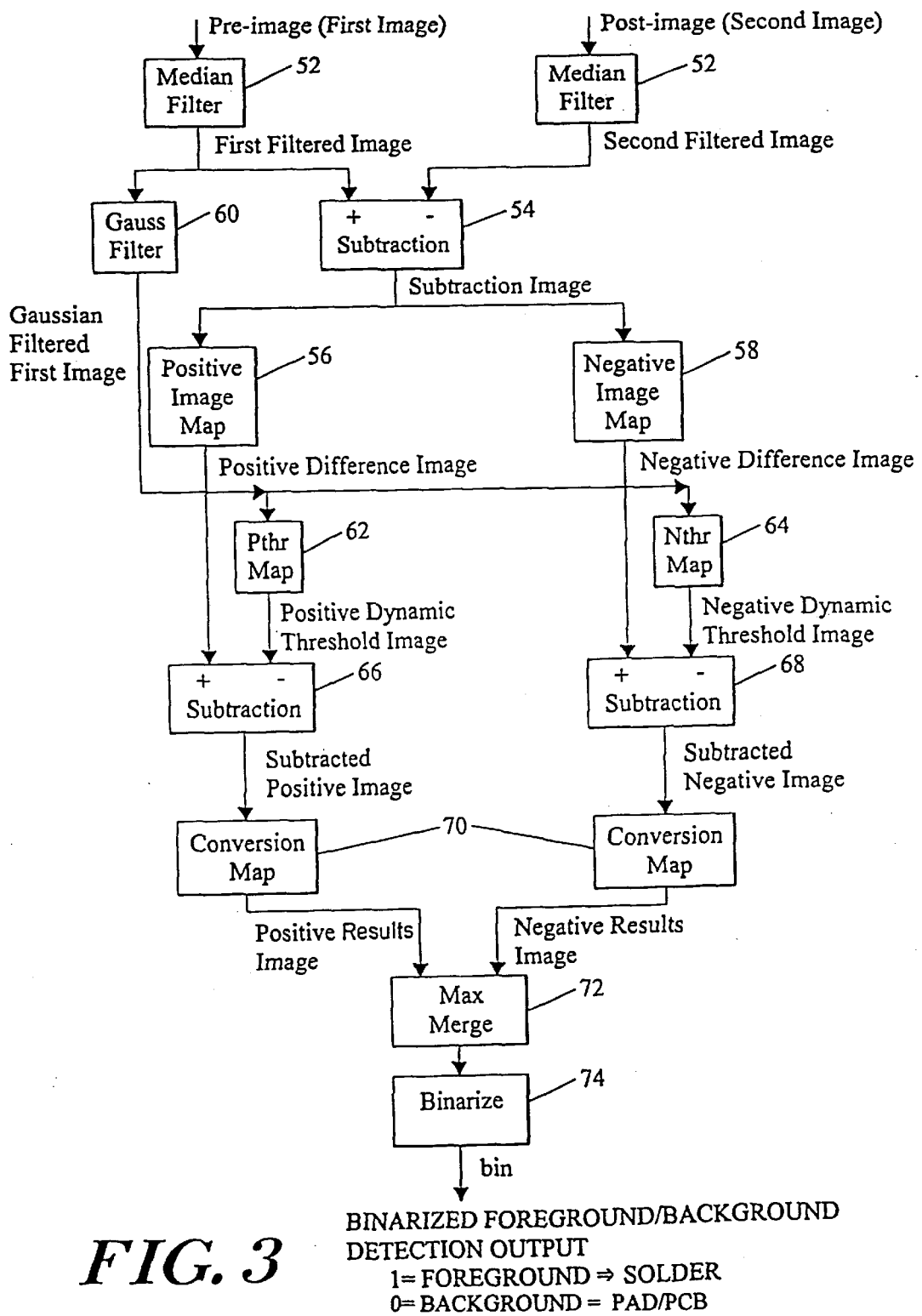
FIG. 3 is a flow diagram of positive polarity/negative polarin detection processing according to the invention.
Figure 4A:
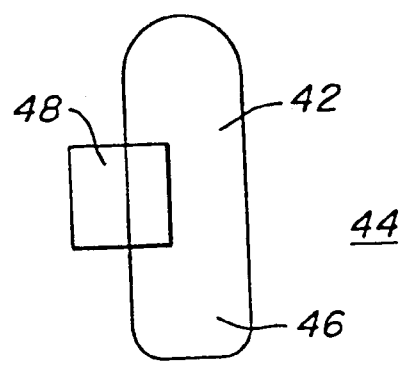
FIGS. 4a–4b are pre-image and post image diagrammatic representations, respectively, of a field of view including a portion of a foreground feature of interest (solder paste) on a background.
Figure 4B:
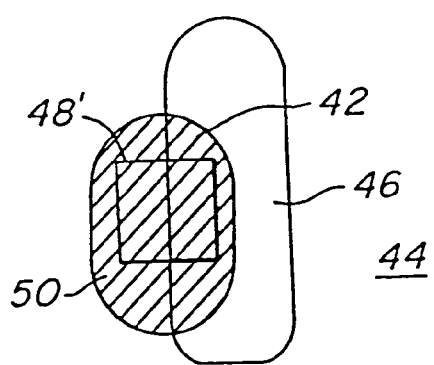

Referring now to FIGS. 3, 4a and 4b, a positive polarity/negative polarity detection implementation illustratively involves processing of a pre-image (FIG. 4a) constituting the first image and a post image (FIG. 4b) constituting the second image, such as would be captured in the pre-post solder inspection system described hereinbefore. Positive polarity detection corresponds to detecting paste or feature of interest in pads or on a background brighter than the feature of interest. This corresponds to positive channel processing described in detail hereinafter. Negative polarity corresponds to detecting feature of interest (i.e. solder paste) in areas of background that are darker than the feature of interest. This corresponds to negative channel processing. In this illustrative embodiment involving a pre-post solder paste inspection implementation, the foreground being processed for inspection is features of interest constituted by solder paste areas 42 (FIG. 4a) deposited on the circuit board (not necessarily where solder is expected to be disposed), and the background is board areas 44 and solder pad areas 46. A pre image field of view 48 (FIG. 4a), for purposes of example, is constituted by a plurality of points or picture elements comprised by on-pad areas, on-board areas and interface or transition areas where the pad meets the board. A post image field of view 48' (FIG. 4b) has solder paste 50 disposed therein, which for purposes of exemplifying the invention is disposed in part on on-pad areas, on-board areas and interface areas (entirely encompassing the field of view).

FIGS. 5a, and 5b are illustrative of gray level values constituting the pre-image 46 and post image 46', respectively, captured in a pre-post inspection method wherein the gray level value of pixels representative of solder paste is 120. FIG. 5a illustrates that prior to paste deposition, pixels in the background (Pixel Cols. 1 and 2) are darkest and have the lowest gray level values, e.g. 70. Pixels at the interface area (Pixel Col. 3) are brighter than the background area and have a gray level value of 120 (the same value as paste, even though there is no paste deposited). Pixels on the pad area (Pixel Cols. 4 and 5) are the brightest., having a gray level value of 150.

After deposition of solder paste (FIG. 4b, assuming uniformity of paste having a gray level value of 120), as illustrated in the post image pixels in FIG. 5b, gray level values of background pixels having solder paste deposited thereon change to 120, as do pad areas having solder deposited thereon (areas that do not have solder deposited thereon should not change). Some areas that had gray level values in the pre-image that are equal to the gray level value of the paste will not be discernable as having or not having paste disposed thereon. These areas correspond to the edges or interface discussed hereinbefore.

In the process illustrated in FIG. 3, the pre-image (46, FIG. 4a) and postimage (46', FIG. 4b) are first median filtered 52, as known in the art, to reduce noise. The filtered post image is then subtracted 54 from the filtered pre-image to provide a subtraction image. In the subtraction image illustrated in FIG. 5c, the results of subtracting the gray level values of the pre-image pixels from the gray level values of the post image pixels are illustrated. It should be noted that values in the subtraction image are polarized. That is, there are positive values (Cols. 1 and 2) and negative values (i.e. Cols. 4 and 5) associated with pixels in the subtraction image. Additionally, there are magnitude differences in the values that make it difficult to select a single scalar threshold value above or below which definitive classification of pixels could be made (this is especially difficult in situations where there is less uniformity of gray level values than in the instant example). If the known methods of subtraction and a scalar threshold value are used as the processing methodology, another problem observed in this example is that there are areas of the board that have the same gray level value as the paste (i.e. edge areas, Col. 3), whereat information is lost and it will not be discernable whether or not paste is present.

Figure 7:
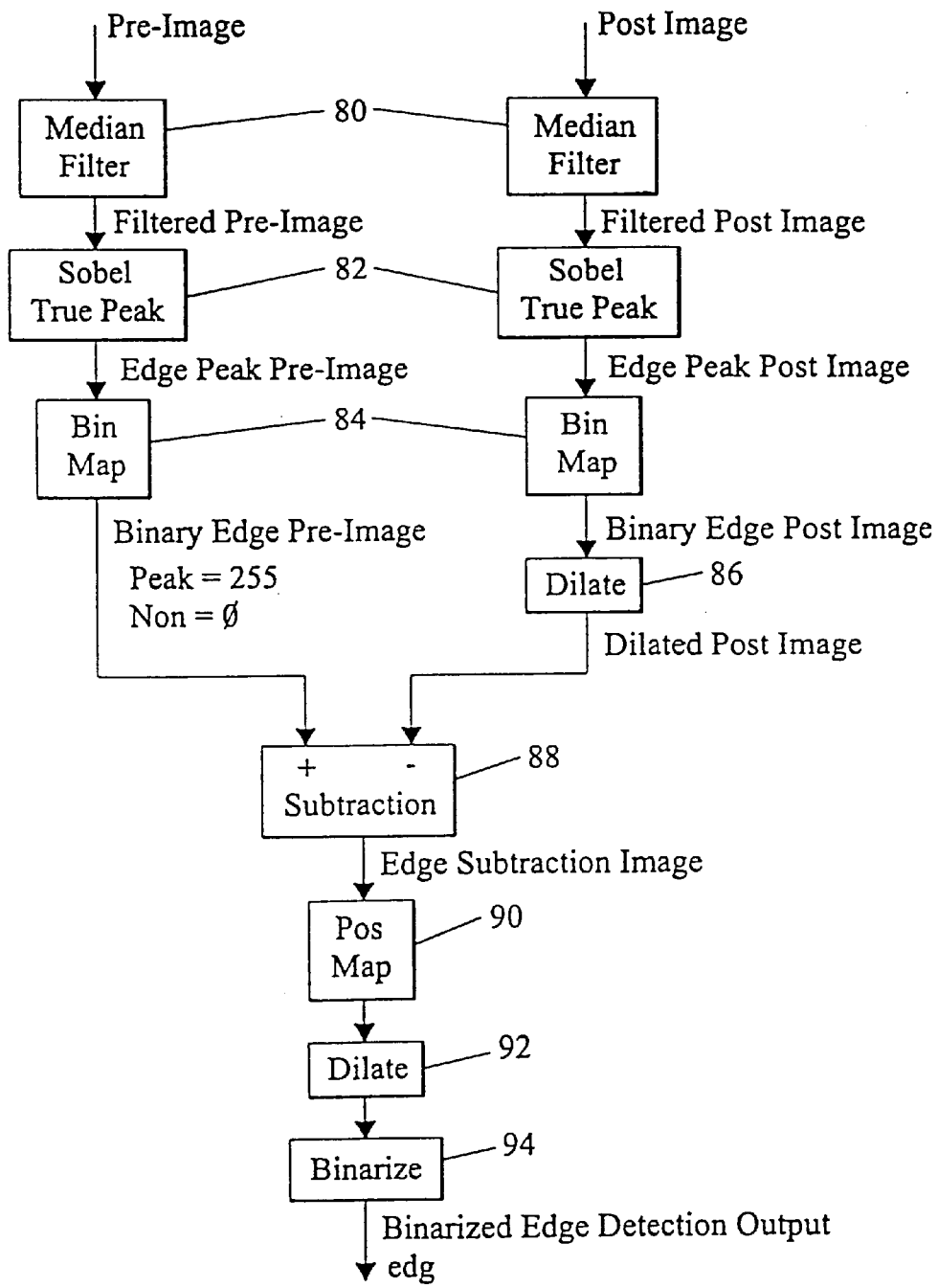
FIG. 7 is a flow diagram of interface detection processing.

These problems are addressed in the methodology implemented according to the invention which separately processes positive and negative information from the subtraction image (FIG. 3), and which independently processes edge information (FIG. 7).

Referring again to FIG. 3, the resulting subtraction image, generated by subtraction 54 of the second image from the first image, is separated into two components to separately process positive and negative information. Positive information, which in this illustrative embodiment is on-pad information, is processed in a "positive channel" by initially using a positive image map 56. The positive image map effectively masks negative values out of the subtraction image (FIG. 5c) to generate a positive difference image, illustrated in FIG. 5d, containing only positive differences for processing in the positive channel.

Negative information from the subtraction image, which in this embodiment is on-board information, is processed in a "negative channel" by initially using a negative image map 58. The negative image map effectively masks positive values out of the subtraction image (FIG. 5c) to generate a negative difference image, illustrated in FIG. 5e, containing only negative differences for processing in the negative channel. The negative difference image contains only absolute values of negative differences for processing.

Generally, the positive image map 56 and the negative image map 58 (and generally the threshold and conversion maps described hereinafter), are pixel maps or point to point transformations implemented in this illustrative embodiment in lookup tables. The positive and negative pixel or image maps take an input image (in this case the subtraction image is the input image), effect a transformation, and provide an output image. The output image contains pixel values that are define in the map as corresponding to values of the pixels in the input image. Specifically, the positive image map 56 in this illustrative embodiment generates the positive difference image (FIG. 5d) in which positive differences are retained and all negative values are transformed to zero, while the negative image map 58 generates the negative difference image (FIG. 5e) in which all positive values are transformed to zero and all negative values are transformed to their respective absolute values.

The pre-image or first filtered image is additionally used to generate a reference image for purposes of thresholding. The pre-image or first filtered image is run through a Gaussian filter 60 as known in the art, which is an averaging filter that takes an average of a selected number of local (adjacent) points. The average of the averaged local points is substituted for the respective value for each pixel used in computing the average which results in a Gaussian filtered first image. For purposes of this example, the Gaussian filtered first image is assumed to have the same pixel values as the pre-image of FIG. 5a.

The Gaussian filtered first image is input to a positive threshold map 62 and a negative threshold map 64 to yield a positive dynamic threshold image and a negative dynamic threshold image, respectively. Thus the positive and negative threshold maps 62, 64, i.e. pixel maps in this illustrative embodiment, are both a function of the filtered pre-image. These pixel maps implement masking and a concept of adaptive gain for the threshold values in the threshold images.

Masking out of areas that are not of interest in the respective channels is achieved by setting the threshold to 255, since thresholding is ultimately achieved by subtracting the threshold image from the difference image and retaining the resulting positive values.

The second purpose of the threshold maps 62, 64 is to achieve adaptive gain. The further the gray level values of the background are away from the gray level values of the paste, the greater is the resulting difference value of the contrast (that is if the paste happens to fall on it). Therefore, a threshold that is proportional to the difference of the background from the paste gray level is generated. A positive and a negative ratio ("P_ratio" and "n_ration") are used to represent the ratio of proportion or slope of the linear function for the positive threshold map and the negative threshold map, respectively. It should be noted that computations that effect adaptive gain (according to the equations hereinafter) are valid only for pixels where there is no masking.

Figure 6:
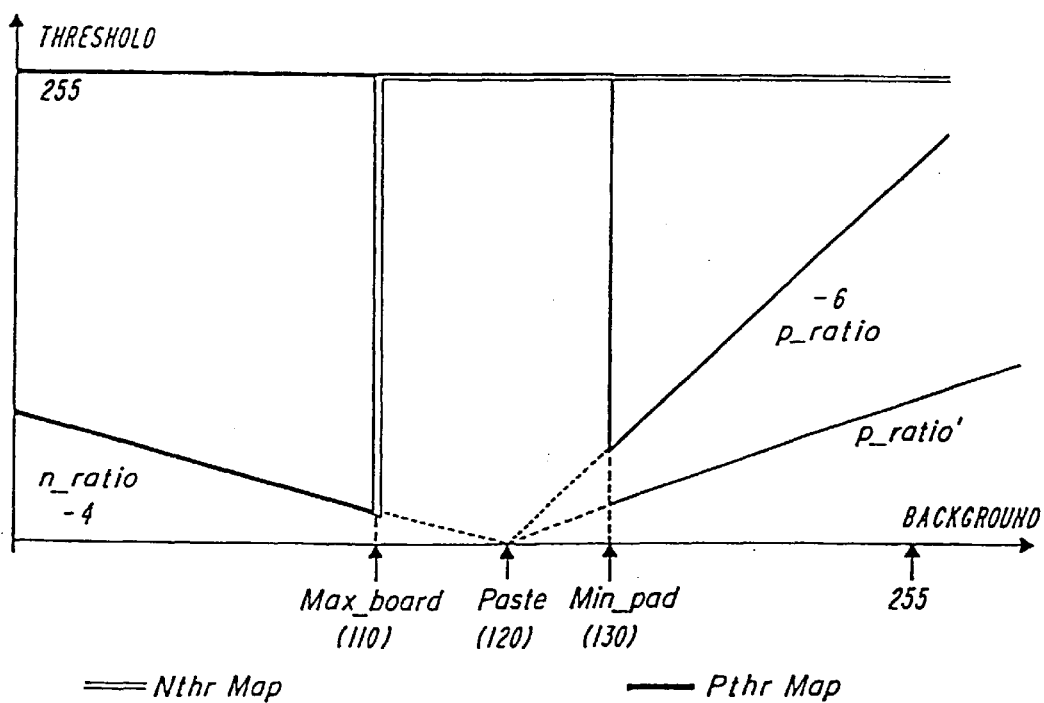
FIG. 6 is a graph illustrating positive and negative threshold maps implemented in the processing of FIG. 3.

The pixel maps used to derive the two threshold images are illustrated in FIG. 6. The pixel maps in this illustrative embodiment rely on certain user specified and empirically derived parameters, including: a user specified paste gray level value ("paste"); a user specified pad minimum gray level value ("min_pad"), selected to be 130 in the present example); a user specified board gray level value ("max_board", selected as 110 in the present example); and empirically derived user specified ratios or slopes for defining the positive threshold map (i.e. p_ratio) and negative threshold map (i.e. n_ratio). It should be appreciated that the specified ratios (p_ratio and n_ratio) are empirically derived as a function of the application, and more specifically in this illustrative embodiment are derived from the gray level image of the board in order to minimize, for example, noise, unexpected reflection, and difficulties associated with the complexity of the background. Further, the other user specified parameters can be based on a mean established from the gray level images of a plurality of boards in the same application.

The pixel map used to derive the positive threshold image (positive threshold map, "Pthr Map", 62, FIG. 3) effects masking according to the consideration that in the positive channel only the positive differences, indicative of information in the pad area, is of interest (post is subtracted from pre), i.e. any gray level value below the minimum pad gray level (min_pad) value is masked out. Thus in implementing the positive threshold map in this illustrative embodiment, only pixels in the pre-image that are greater than a minimum pad (min_pad) value are of interest, and all pixels with a value less than that min_pad value will be effectively masked by assigning them a value of 255. In the present example p_ratio is selected to be 0.6. Pixels with values greater than the min-pad value will have a threshold determined therefor as a function of the paste value and the p_ratio That is, in generating a positive dynamic threshold image as illustrated in FIG. 5f, for each input pixel "i" the threshold map determines a threshold output value "o", as follows:

if i<min_pad;
o[i]=255;
else o[i]=(i−paste) * p_ratio.

Similarly, the pixel map used for determining the negative threshold image (negative threshold map, "Nthr map", 64, FIG. 3), is implemented according to the consideration that the negative channel is only concerned with the negative differences in the board area, i.e. any gray level above the maximum board gray level (max_board) is masked out. Thus in implementing the negative threshold map in this illustrative embodiment, only pixels in the pre-image that are less than a maximum board (max_board) value are of interest, and all pixels with a value greater than that max_board value will be effectively masked by assigning them a value of 255 (again in this example, the Gaussian filtered image is assumed to have the same pixel values as the pre-image of FIG. 5a). In the present example n_ratio is selected to be 0.4. Pixels with values less than the max_board value will have a threshold determined therefor as a function of the paste value and the n_ratio. In generating a negative dynamic threshold image as illustrated in FIG. 5g, for each input pixel "i" the threshold map determines a threshold output value "o", as follows:

if i>max_board;
o[i]=255;
else o[i]=(paste−i) * n_ratio.

There is a range of pixel values illustrated in FIG. 6 where both the positive and negative differences are completely masked out. This causes the areas of edges between the board and pad to be ignored. However, this is handled separately by the edge interface processing described in detail hereinafter.

The two separate dynamic threshold images, i.e, positive and negative, both derived from the smoothed pre-image, are respectively applied to effect thresholding in the positive and negative channels. It should be noted that despite the names negative image and negative threshold image, these images both have positive values, as the naming convention is used just to designate that it is a negative channel.

Dynamic thresholding according to the invention is effected in the positive channel when the positive difference image (FIG. 5d) and the positive dynamic threshold image (FIG. 5f) are subject to a subtraction operation 66 to yield a subtracted positive image. The subtracted positive image, illustrated in FIG. 5h, comprises negative values that represent points or pixels that are not of interest, i.e. they do not exceed the dynamic threshold. Positive values in the subtracted positive image represent features of interest, which in the case of the positive channel is solder paste on a pad. Likewise, the negative difference image (FIG. 5e) and the negative dynamic threshold image (FIG. 5g) are subtracted 68. The resultant subtracted negative image, illustrated in FIG. 5i, comprises negative values that represent points or pixels that are not of interest, and positive values that represent features of interest, which in the case of the negative channel is solder paste on the board.

Both the subtracted positive image and the subtracted negative image are passed through a conversion map 70, to yield respectively, a positive results image, illustrated in FIG. 5j, and a negative results image, illustrated in FIG. 5k, wherein positive values are set to 255 (i.e. pixels that were greater than the threshold representing paste on pad and paste on board), and the rest are set to 0. Next, the two channels, i.e. the positive results image and the negative results image, are merged in a merge operation 72. In this illustrative embodiment, the positive and negative results image are merged using a pixel to pixel maximum operation, however, it will be appreciated that the images could be merged via alternative operations, such as by an adding operation.

The merged image, FIG. 5l, is then binarized 74 to set all positive values to "1" and zero values to "0", yielding a binarized foreground/background detection output. Although the binarized foreground/background detection output clearly indicates where solder paste is present on the pad(s) and on the board, the edges between the board and the pad have effectively been ignored, as the information was lost as the gray level value of the paste was substantially equal to the gray level value of the edge or transition area.

Referring now to FIG. 7, according to the pre-post solder paste inspection implementation of the invention, pre-image and post image information is subject to separate processing to ensure the validity of edge information. The first step in determining pad/board edge or interface information is to subject the pre-image and the post image to median filtering 80 to reduce noise, as in the foreground/background detection described hereinbefore with respect to FIG. 3.

The filtered pre-image and filtered post image are then passed through a Sobel edge detector 82, as known in the art, followed by True peak detection, forming an edge peak pre-image and an edge peak post image. Sobel edge detection provides edge position information to integer precision, i.e. full pixel edge detection, with an indication of edge magnitude and orientation or direction. Not all of the edges in the edge map detected in the Sobel process represent real edges in the original image, and some may be spurious or superfluous edges representing unnecessary computational overhead if they are retained. Accordingly, in the true peak detection processing all but "true peak" edge pixels are eliminated from the edge map resulting from Sobel edge detection.

To eliminate all but "true peak" edge pixels, all edge pixels that are not coincident with the local maximum or peak of the edge map are eliminated, where the local maximum is taken along the direction of each edge pixel. The direction of the edge pixel is quantized, for example, such that the direction is one of N, NE, E, SE, S, SW, W, or NW. To eliminate all but the "true peak" edge pixels, the direction of each edge pixel in the edge map is looked up. Then, the first difference of the corresponding image pixels is computed along the quantized direction of the edge pixel. In one embodiment of true peak detection, this first difference is looked up in a table of first difference results obtained from previously computed edge detection operations. Next, the peak (i.e., maximum) of this first difference taken along the direction of the edge pixel is found. If the peak is not coincident (i.e., in overlapping relationship) with an edge pixel, that edge pixel is discarded.

In a case when the "peak" consists of two or more edge pixels of the same edge magnitude for a given quantized direction, then it is useful to reduce the number of these edge pixels. It is assumed that, for edge pixels of the same edge magnitude for a given quantized direction, edge pixels disposed farther along the given quantization direction are retained in preference over "nearer" edge pixels. For example, if the given quantization direction is W (right-to-left), then for two otherwise equivalent neighboring edge pixels, the left-most edge pixel will be selected as the "true peak" edge pixel. Accordingly, Sobel edge detection and true peak processing are effected to provide the edge peak pre-image and edge peak post image.

Next, the edge peak pre-image and the edge peak post image are converted to 8-bit binary images using a binarization map 84 (Bin Map). The presence of an edge peak is denoted by a "255" and the lack of one by "0". Examples of the binary edge peak pre-image and the binary edge peak post image based on the pre-image and post image of FIGS. 5a and 5b are illustrated in FIGS. 8a and 8b, respectively.

The binary edge post-image is then dilated 86. Dilation, as known in the art, is a morphological operation that enlarges objects in an image. Dilation eliminates small dark gaps and holes, and enlarges lighter features such as thin lines and fine detail.

The dilated post image is then subtracted 88 from the binary edge pre-image, resulting in an edge subtraction image as illustrated in FIG. 8c. If an edge occurred in the pre-image and was absent from the dilated post image then the result of the subtraction is positive (255). Edge processing according to the invention operates based on the assumption that if an edge occurs in the pre-image and is absent in the dilated post (dilation being done to handle sub-pixel mis-registration), then the reason for the edges absence from the dilated post image is that it must be occluded by paste. Thus the edge pixels present in the pre-image but absent from the dilated post image, as determined by the subtraction of the dilated post image from the binary edge pre-image, must constitute paste pixels.

The resultant edge subtraction image is then: processed through a positive value map 90 (Pos Map) to eliminate any negative values and retain any positive values that resulted from the subtraction; dilated 92 to accommodate large breaks or slow transitioning edges; and binarized 94 to set positive values to "1" and zero values to "0". A binarized edge detection output is then available for merging with the binarized foreground/background detection output.

Figure 9:
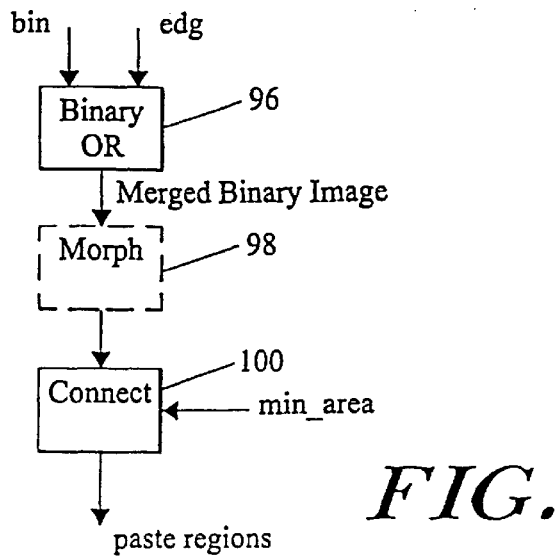
FIG. 9 is a flow diagram illustrating merging of the output of the foreground/background detection processing of FIG. 3 and the output of the interface detection processing of FIG. 7.

As illustrated in FIG. 9, the two binary images, i.e. the binarized foreground/background detection output ("bin") and the binarized edge detection output ("edg") are then merged using a binary-OR. The resultant merged binary image is optionally subjected to a binary morphological operation, which is effectively a size/shape filter to effect cleanup of defects resulting from merging the binary images. A connectivity operation 100 is effected, for example using Cognex Blob Tool, to determine the position and size of contiguous paste regions in accordance with a specified minimum feature area. The resultant image provides an accurate indication of contiguous paste regions or features of interest as discriminated from complex backgrounds.

Although present invention is described and implemented in a vision system in the context of a dynamic subtraction methodology, it should be appreciated that the concepts may also be applied to the static methods that involve image subtraction, such as Golden Template Comparison or the like.

Although the present invention is implemented and described in the context of a pre-post solder paste inspection system, it will be appreciated that the method and apparatus described hereinbefore can be implemented in various contexts including or other vision systems implementing label inspection, golden template comparison, or the like.

Likewise, it will be appreciated that although the invention described in an illustrative embodiment herein effects inspection of solder paste applied to printed circuit boards, it can be similarly implemented in processes to effect inspection of other materials such as screen printed adhesives, conductive adhesives or the like, applied on substrates other than printed circuit boards. Furthermore, although the illustrative system is described in an "in-line" implementation with a screen printing process, the invention can be implemented and/or the inventive concepts herein modified to be used to inspect solder paste or adhesives applied in other ways.

While the positive and negative image maps and the threshold and conversion maps described hereinbefore are point to point transformations implemented in the illustrative embodiment in lookup tables, it should be appreciated that such transformations could be alternatively implemented with other data structures, such as arrays, or the like, or they may be computed directly.

Although the positive channel threshold and negative channel thresholds described herein were linear functions having particular slopes of 0.4 and 0.6 respectively, it should be appreciated that the slope of the function can be any of various slopes as a function of the application.

Those skilled in the art will appreciate that some, or all, of the steps of subtraction, mapping, thresholding, and ORing described hereinbefore can be combined and effected as hardware implementations, software implementations or a combination thereof, and that although a vision system is described implemented with a Cognex vision system and vision tools, the invention can be implemented on other platforms, such as general purpose computers running software and/or configured with hardware to effect the functionality described herein. Additionally, the methods herein can be implemented as software deliverable on a machine readable medium, such as magnetic disks or tapes, magnetooptic disks, or the like.

Although in the method and apparatus described hereinbefore positive and negative channel images are described as logically ORed to merge and ultimately effect a single binary image, it will be appreciated that other means of combining the respective images, such as adding or the like, can be effected to arrive at images or an image representative of the logically combined images.

Although the invention has been shown and described with respect to exemplary embodiments thereof, various other changes, omissions and additions in the form and detail thereof may be made therein without departing from the spirit and scope of the invention.

What is claimed is:

1. A machine vision apparatus implementing thresholding in a vision system application involving comparison of a first image and a second image, comprising:

an image acquisition device capturing said first image comprising a plurality of first image pixels and said second image comprising a plurality of second image pixels;

a memory receiving from said image acquisition device first image information defining said plurality of first image pixels as a respective gray level value for each of said plurality of first image pixels, and receiving second image information defining said plurality of second image pixels as a respective gray level value for each of said plurality of second image pixels; and a processor generating a dynamic threshold image as a function of said gray level value of said first image pixels and said gray level values of said second image pixels, said processor subtracting gray level values of said second image pixels from gray level values of said first image pixels to provide a subtracted image having a plurality of subtracted image pixel values, and said processor implementing thresholding by subtracting said subtracted image from said dynamic threshold image.

* * * * *